United States Patent
Huang

(10) Patent No.: US 10,963,178 B2
(45) Date of Patent: Mar. 30, 2021

(54) REPETITIVE DATA PROCESSING METHOD FOR SOLID STATE DRIVE

(71) Applicants: Lite-On Electronics (Guangzhou) Limited, Guangzhou (CN); LITE-ON TECHNOLOGY CORPORATION, Taipei (TW)

(72) Inventor: Chih-Ming Huang, Taipei (TW)

(73) Assignee: SOLID STATE STORAGE TECHNOLOGY CORPORATION, Taipei (TW)

(*) Notice: Subject to any disclaimer, the term of this patent is extended or adjusted under 35 U.S.C. 154(b) by 8 days.

(21) Appl. No.: 16/589,739

(22) Filed: Oct. 1, 2019

(65) Prior Publication Data
US 2020/0387318 A1    Dec. 10, 2020

(30) Foreign Application Priority Data
Jun. 5, 2019 (CN) .......................... 201910486613.3

(51) Int. Cl.
*G06F 3/06* (2006.01)
*G06F 11/10* (2006.01)

(52) U.S. Cl.
CPC .......... *G06F 3/0641* (2013.01); *G06F 3/0608* (2013.01); *G06F 3/0659* (2013.01); *G06F 3/0673* (2013.01); *G06F 11/1068* (2013.01)

(58) Field of Classification Search
CPC .. G06F 12/0246; G06F 3/0608; G06F 3/0638; G06F 3/0641; G06F 3/0673; G06F 3/0679; G06F 2212/7201; G06F 11/1068; G06F 11/1453; G06F 16/1748–16/1756
See application file for complete search history.

(56) References Cited

U.S. PATENT DOCUMENTS

| 8,924,816 | B2 | 12/2014 | Khan |
| 9,043,668 | B2* | 5/2015 | Goss ................ H03M 13/2906 714/755 |
| 10,564,850 | B1* | 2/2020 | Gud ...................... G06F 3/0641 |
| 2016/0171029 | A1* | 6/2016 | Sanvido ............... G06F 3/0641 707/745 |

FOREIGN PATENT DOCUMENTS

| CN | 101916228 | 12/2010 |
| CN | 103136109 | 6/2013 |

* cited by examiner

*Primary Examiner* — Reginald G Bragdon
*Assistant Examiner* — Curtis James Kortman
(74) *Attorney, Agent, or Firm* — WPAT, PC

(57) ABSTRACT

A repetitive data processing method for a solid state drive is provided. The solid state drive includes a non-volatile memory. The repetitive data processing method includes the following steps. Firstly, a write data is received. The write data contains plural codewords. Then, an encoding operation is performed on the plural codewords sequentially, thereby generating plural error correction codes sequentially. If at least two consecutive error correction codes of the plural error correction codes are identical to a first error correction code, the solid state drive confirms that the write data contains a repetitive data and enabling a repetitive data management mechanism.

9 Claims, 4 Drawing Sheets

REPETITIVE DATA PROCESSING METHOD FOR SOLID STATE DRIVE

This application claims the benefit of People's Republic of China Patent Application No. 201910486613.3, filed Jun. 5, 2019, the subject matter of which is incorporated herein by reference.

FIELD OF THE INVENTION

The present invention relates to a data processing method for a solid state drive, and more particularly to a repetitive data processing method for a solid state drive.

BACKGROUND OF THE INVENTION

As is well known, a solid state drive (SSD) is a data storage device that uses a non-volatile memory to store data. After data are written to the non-volatile memory, the data are still retained in the solid state drive even if no electric power is supplied to the non-volatile memory.

FIG. 1 is a schematic functional block diagram illustrating the architecture of a conventional solid state drive. As shown in FIG. 1, the solid state drive 10 comprises a control circuit 110, a buffer 120 and a non-volatile memory 130. For example, the buffer 130 is a dynamic random access memory (DRAM), and the non-volatile memory 130 is a NAND flash memory.

The control circuit 110 is in communication with a host 12 through an external bus 20. Consequently, commands and data can be exchanged between the control circuit 110 and the host 12. For example, the external bus 20 is a USB bus, an SATA bus, a PCIe bus, an M.2 bus, a U.2 bus, or the like.

In the solid state drive 10, the control circuit 110 is connected with the non-volatile memory 130 through an internal bus. According to a write command from the host 12, a write data from the host 12 is stored into the non-volatile memory 130 by the control circuit 110. Alternatively, according to a read command from the host 12, the control circuit 110 acquires a read data from the non-volatile memory 130 and transmits the read data to the host 12.

The control circuit 110 further comprises a flash translation layer (FTL) 114. The flash translation layer 114 contains a logical-to-physical table 115. The logical-to-physical table 115 is also referred as a L2P table. The control circuit 110 can manage the data in the non-volatile memory 130 through the L2P table 115. For updating the L2P table 115 in real time, the L2P table 115 is usually stored in a volatile memory. For example, the contents of the L2P table 115 are stored in a static random access memory (SRAM) or a dynamic random access memory (DRAM) that is included in the control circuit 110. Alternatively, the contents of the L2P table 115 are stored in the buffer 120 that is disposed outside the control circuit 110.

For example, when the host 12 issues a write command, the control circuit 110 receives a write data and a logical address. The write data is temporarily stored in the buffer 120 by the control circuit 110. After the write data in the buffer 120 is encoded by an error correction (ECC) circuit 112 of the control circuit 110, the write data is converted into an encoded write data. Then, the encoded write data is stored into a physical address of the non-volatile memory 130 by the control circuit 110. Moreover, the mapping relationships between the logical address and the physical address are recorded into the L2P table 115 of the flash translation layer 114 by the control circuit 110. For example, the logical address is a logical allocation address, and the physical address is a physical allocation address.

When the host 12 issues a read command, the control circuit 110 receives a logical address. Firstly, the control circuit 110 confirms the physical address corresponding to the logical address according to the contents of the L2P table 115 of the flash translation layer 114. Then, the encoded read data stored in the physical address of the non-volatile memory 130 is transmitted to the control circuit 110 and temporarily stored in the buffer 120. After the encoded read data in the buffer 120 is decoded by the ECC circuit 112, a read data is generated. Then, the read data is transmitted to the host 12 by the control circuit 110.

FIG. 2 schematically illustrates the mapping relationships between the logical address and the physical address recorded in the L2P table of the conventional solid state drive. As shown in the L2P table 115, the non-volatile memory 130 contains n physical addresses PA_0~PA_n−1.

The logical address LA_70 corresponds to the physical address PA_1. When the host 12 issues a write data corresponding to the logical address LA_70, the write data is encoded into an encoded write data and the encoded write data is stored into the physical address PA_1 of the non-volatile memory 130.

The logical address LA 120 corresponds to the physical address PA_2. When the host 12 issues a write data corresponding to the logical address LA 120, the write data is encoded into an encoded write data and the encoded write data is stored into the physical address PA_2 of the non-volatile memory 130.

The logical address LA_55 corresponds to the physical address PA_4. When the host 12 issues a write data corresponding to the logical address LA_55, the write data is encoded into an encoded write data and the encoded write data is stored into the physical address PA_4 of the non-volatile memory 130.

The logical address LA_60 corresponds to the physical address PA_n−1. When the host 12 issues a write data corresponding to the logical address LA_60, the write data is encoded into an encoded write data and the encoded write data is stored into the physical address PA_n−1 of the non-volatile memory 130.

In the L2P table 115, the physical addresses PA_0, PA_3 and PA_5 have no corresponding logical addresses. That is, no data are stored in the physical addresses PA_0, PA_3 and PA_5 of the non-volatile memory 130.

As mentioned above, all of the write data issued from the host 12 are stored into the non-volatile memory 130 of the conventional solid state drive 10.

In some specified situations, the host 12 continuously issues repetitive data as the write data. The contents of the repetitive data are identical.

When the host 12 continuously issues repetitive data as the write data, the repetitive data are also stored into the non-volatile memory 130 of the conventional solid state drive 10. Consequently, the non-volatile memory 130 needs to have sufficient space to store the plural identical data. In addition, the process of writing the repetitive data into the non-volatile memory 130 may increase the program time of the solid state drive 10.

SUMMARY OF THE INVENTION

An embodiment of the present invention provides a repetitive data processing method for a solid state drive. The solid state drive includes a non-volatile memory. The repetitive data processing method includes the following steps.

Firstly, a write data is received. The write data contains plural codewords. Then, an encoding operation is performed on the plural codewords sequentially, thereby generating plural error correction codes sequentially. If at least two consecutive error correction codes of the plural error correction codes are identical to a first error correction code, the solid state drive confirms that the write data contains a repetitive data and enabling a repetitive data management mechanism.

Another embodiment of the present invention provides a repetitive data processing method for a solid state drive. The solid state drive includes a non-volatile memory. The repetitive data processing method includes the following steps. Firstly, a write data is provided. The write data contains a first page data. The first page data contains plural codewords. Then, an encoding operation is performed on the plural codewords of the first page data, thereby generating plural error correction codes. If the plural error correction codes are identical, the solid state drive confirms that the write data contains a repetitive data and enabling a repetitive data management mechanism.

A further embodiment of the present invention provides a repetitive data processing method for a solid state drive. The solid state drive includes a non-volatile memory. The repetitive data processing method includes the following steps. Firstly, the solid state drive judges whether a write data contains a repetitive data. If the solid state drive confirms that the write data contains the repetitive data, the solid state drive further judges whether an information corresponding to the repetitive data is recorded in a repetitive data table. If the information corresponding to the repetitive data is not recorded in the repetitive data table, the repetitive data is stored into the non-volatile memory and the information corresponding to the repetitive data and a mapping relationship about the information is newly added into the repetitive data table.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figures 1, 2:
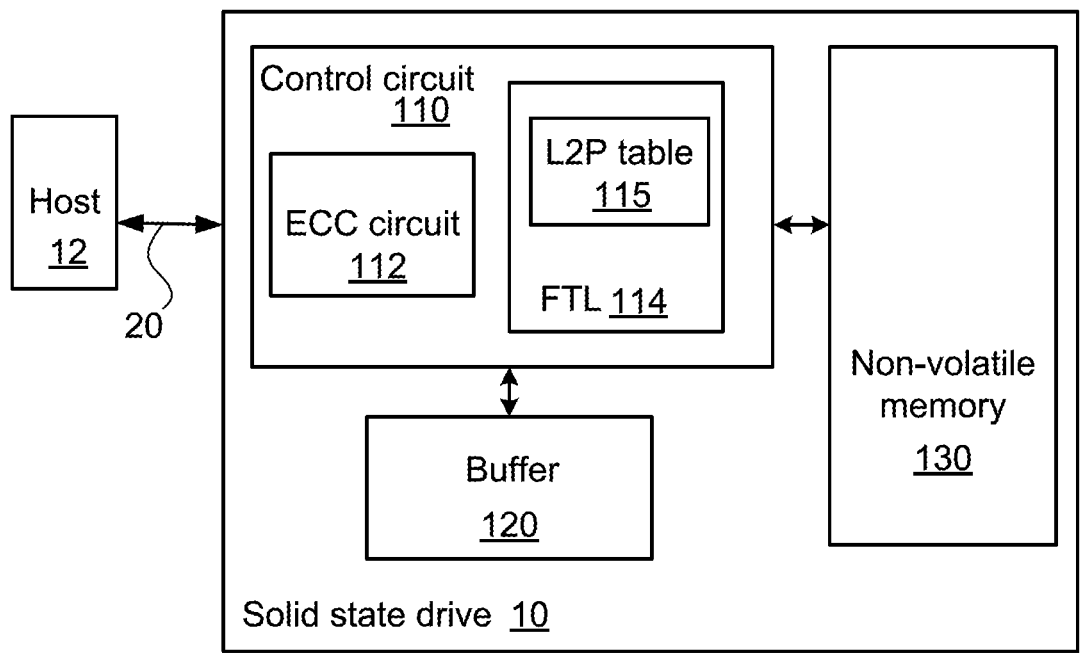
FIG. 1 (prior art) is a schematic functional block diagram illustrating the architecture of a conventional solid state drive.
FIG. 2 (prior art) schematically illustrates the mapping relationship between the logical address and the physical address recorded in the L2P table of the conventional solid state drive.
Figure 3:
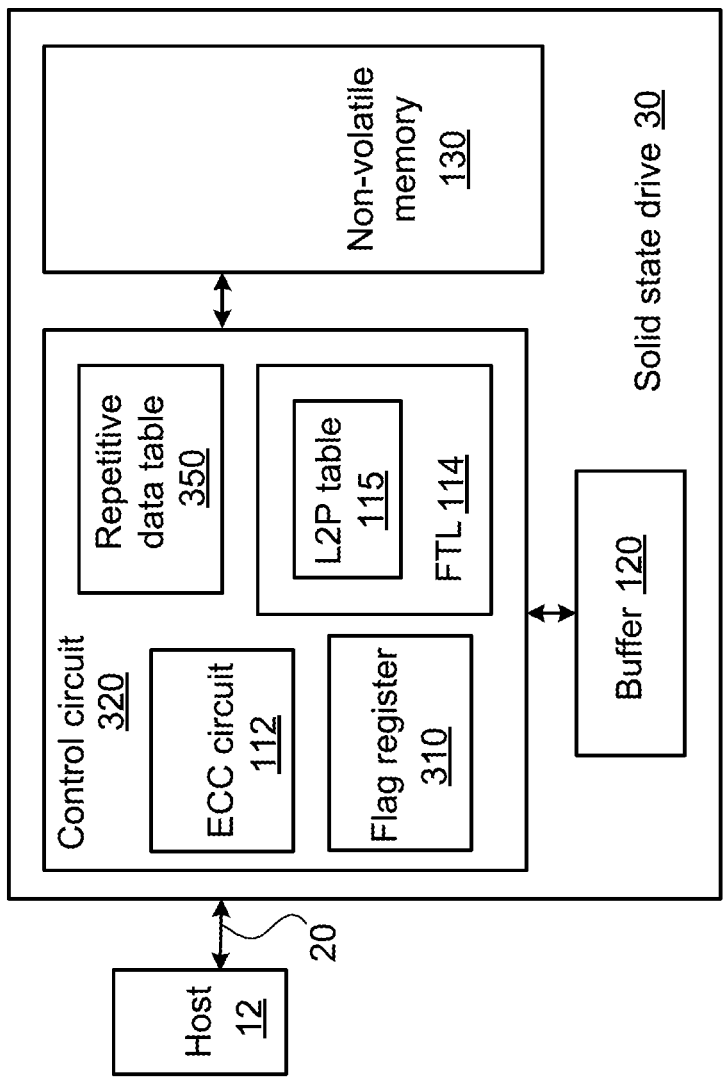
FIG. 3 is a schematic functional block diagram illustrating the architecture of a solid state drive according to an embodiment of the present invention.

FIG. 3 is a schematic functional block diagram illustrating the architecture of a solid state drive according to an embodiment of the present invention. As shown in FIG. 3, the solid state drive 30 comprises a control circuit 320, a buffer 120 and a non-volatile memory 130. In comparison with the conventional solid state drive, the control circuit 320 of the solid state drive 30 of the present invention further comprises a flag register 310 and a repetitive data table 350.

That is, the control circuit 320 of the solid state drive 30 comprises an error correction (ECC) circuit 112, the repetitive data table 350, the flash translation layer (FTL) 114 and the flag register 310. The repetitive data issued from the host 12 and the mapping relationships between the logical address and the physical address corresponding to the repetitive data are stored in the repetitive data table 350. The L2P table 115 and the repetitive data table 350 are stored in a volatile memory. For example, the contents of the L2P table 115 and the repetitive data table 350 are stored in a static random access memory (SRAM) or a dynamic random access memory (DRAM) that is included in the control circuit 320. Alternatively, the contents of the L2P table 115 and the repetitive data table 350 are stored in the buffer 120 that is disposed outside the control circuit 320.

After the host 12 issues a write command, a write data generated by the host 12 is temporarily stored in the buffer 120 by the control circuit 320. After the write data in the buffer 120 is encoded by the ECC circuit 112, a corresponding error correction code (also referred hereinafter as an ECC code) is generated. According to the ECC code, the control circuit 320 judges whether the write data contains the repetitive data.

If the control circuit 320 judges that the write data contains the repetitive data, only the repetitive data generated at the first time is stored into the non-volatile memory 130 by the control circuit 320, but the afterward successively-generated repetitive data are not stored into the non-volatile memory 130 by the control circuit 320. Moreover, the mapping relationships between the logical address and the physical address corresponding to the repetitive data are stored in the repetitive data table 350.

A method of judging the repetitive data and a repetitive data processing method for the solid state drive 30 will be described as follows.

Generally, the non-volatile memory 130 contains plural blocks. In addition, each block contains plural pages. The encoded write data is stored into the non-volatile memory 130 in a page-wise fashion by the control circuit 320. The write data may be divided into plural page data. Each page data contains plural codewords. After the ECC circuit 112 performs the encoding operations on the codewords of each page data, the corresponding ECC codes are generated. The codeword is an encoding unit of the ECC circuit 112. The size of the encoding unit is dependent on the encoding/decoding capability of the ECC circuit 112.

For example, each page is 16k bytes in size, and each codeword has a length of 4k bytes. After each codeword undergoes the encoding operation, the ECC code with the length of 488 bytes is generated. In other words, each page data contains plural 4k-byte codewords. Moreover, after the each codeword is encoded by the ECC circuit 112, the 488-byte ECC is generated.

It is noted that the length of the codeword is not restricted to 4k bytes. For example, the length of the codeword is 1k bytes, 2k bytes, 4k bytes or 8k bytes. Similarly, the size of each page is not restricted to 16k bytes. For example, the size of each page is 32k bytes, 64k bytes or 128k bytes.

Figure 4:
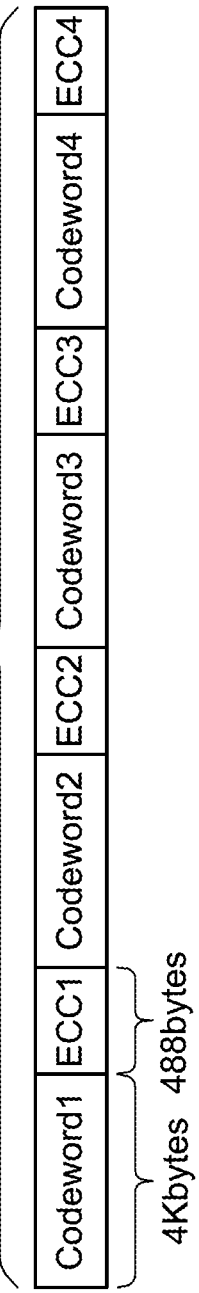
FIG. 4 schematically illustrates the contents of an encoded page data.

FIG. 4 schematically illustrates the contents of an encoded page data. As shown in FIG. 4, a 16k-byte page data contains a first codeword (Codeword1), a second codeword (Codeword2), a third codeword (Codeword3), a fourth codeword (Codeword4), a first ECC code (ECC1), a second ECC code (ECC2), a third ECC code (ECC3) and a fourth ECC code (ECC4). The first codeword (Codeword1), the second codeword (Codeword2), the third codeword (Codeword3) and the fourth codeword (Codeword4) belong to a raw data, i.e., a write data. The first codeword (Codeword1), the second codeword (Codeword2), the third codeword (Codeword3), the fourth codeword (Codeword4), the first ECC code (ECC1), the second ECC code (ECC2), the third ECC code (ECC3) and the fourth ECC code (ECC4) are constituted as an encoded write data. In FIG. 4, the encoded write data of one page (e.g., 16k bytes) is shown. The encoded write data is to be stored in the non-volatile memory 130.

Accordingly, the write data is divided into plural page data, and each page data contains plural codewords. After the ECC circuit 112 performs the encoding operation on the codeword of the page data, the control circuit 320 generates a corresponding ECC code. If the ECC codes corresponding to the codewords of the page data are identical, it means that the write data from the host 12 contains the repetitive data. Meanwhile, the flag register 310 is set, and a repetitive data management mechanism is enabled by the control circuit 320.

Figure 5:
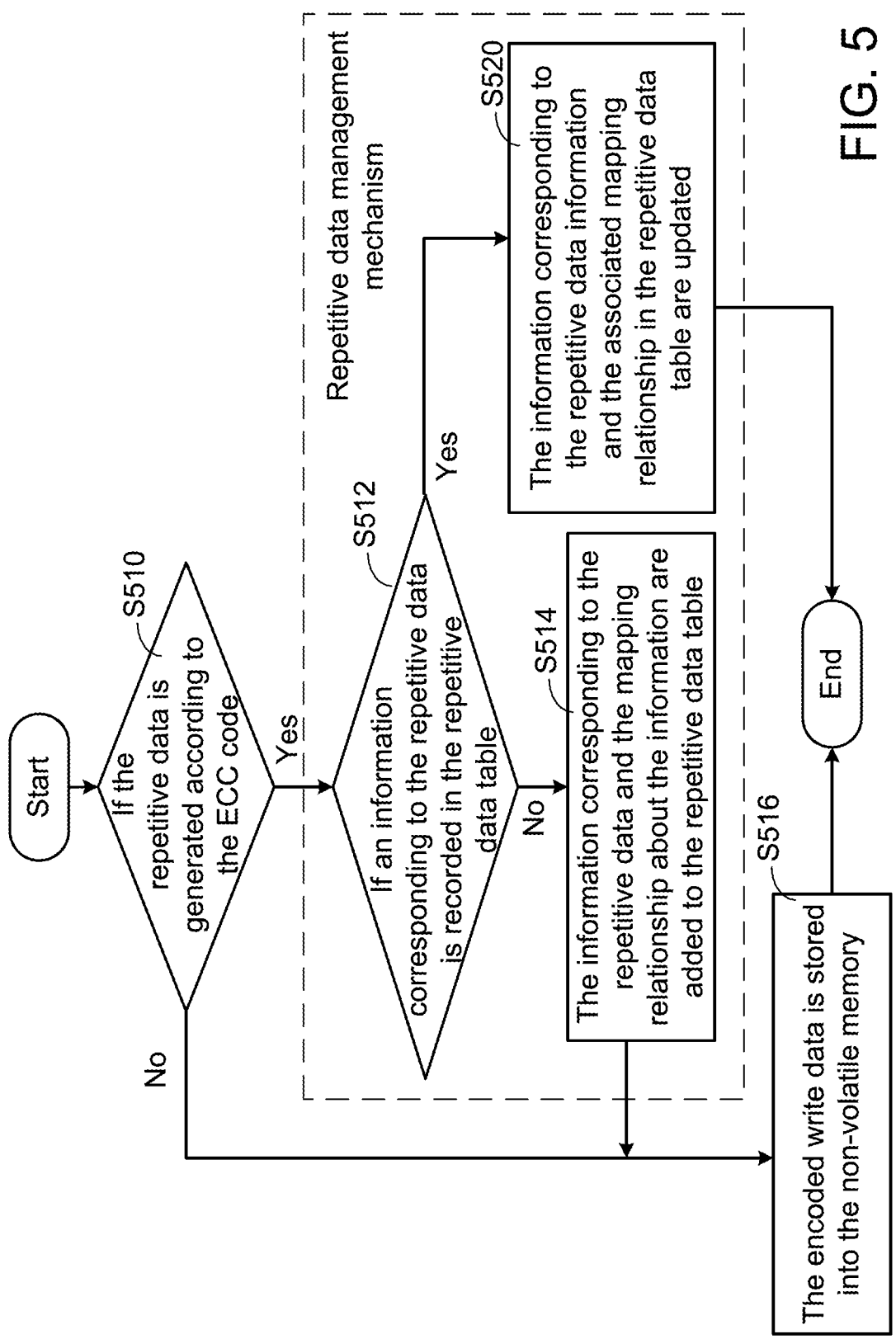
FIG. 5 is a flowchart of a repetitive data processing method according to an embodiment of the present invention.

FIG. 5 is a flowchart of a repetitive data processing method according to an embodiment of the present invention. Firstly, a step S510 is performed to judge whether the repetitive data is generated according to the ECC code. As mentioned above, the ECC circuit 112 generates the corresponding ECC code after the decoding operation is performed on the codeword. If two codewords are identical, the ECC codes generated after the encoding operation are identical. Consequently, according to the ECC code generated by the EC circuit 112, the control circuit 320 can judge whether one page data of the write data contains the repetitive data.

For example, if plural ECC codes corresponding to one page data are identical, it means that the plural codewords in the page data are identical. Meanwhile, the control circuit 320 judges that the page data contains the repetitive data and confirms that the repetitive data is generated. Whereas, if plural ECC codes corresponding to one page data are not all identical, it means that the plural codewords in the page data are not all identical. Meanwhile, the control circuit 320 judges that the page data is not the repetitive data and confirms that the repetitive data is not generated.

If the control circuit 320 confirms that the repetitive data is not generated, the control circuit 320 stores the encoded write data into the non-volatile memory 130 (Step S516). That is, the encoded page data is stored into the non-volatile memory 130.

Whereas, if the control circuit 320 confirms that the repetitive data is generated, the flag register 310 is set, and the repetitive data management mechanism is enabled by the control circuit 320. Then, the control circuit 320 judges whether an information corresponding to the repetitive data is recorded in the repetitive data table 350 (Step S512). If the information corresponding to the repetitive data has been recorded in the repetitive data table 350, the information corresponding to the repetitive data and the mapping relationship about the information in the repetitive data table 350 are updated (Step S520) and the flag register 310 is reset. Then, the flowchart is ended. In other words, the repetitive data will not be stored into the non-volatile memory 130 again, and the encoded page data will not be stored into the non-volatile memory 130.

Whereas, if the information corresponding to the repetitive data has not been recorded in the repetitive data table 350, the information corresponding to the repetitive data and the mapping relationship about the information are added to the repetitive data table 350 (Step S514). Then, the control circuit 320 stores the encoded write data into the non-volatile memory 130 (Step S516). That is, the encoded page data is stored into the non-volatile memory 130. In other words, the repetitive data is first time stored into the non-volatile memory 130.

In this embodiment, the information corresponding to the repetitive data is a specified information of different repetitive data. For example, if one page data is judged as the repetitive data, it means that the page data has a specified ECC code. Meanwhile, the control circuit 320 uses the specified ECC code as the information corresponding to the repetitive data. Then, the control circuit 320 judges whether the specified ECC code has been recorded in the repetitive data table 350. If the specified ECC code has not been recorded in the repetitive data table 350, the specified ECC code and the mapping relationship are newly added to the repetitive data table 350. The mapping relationship is the relationship between the physical address of the non-volatile memory 130 storing the repetitive data and the corresponding logical address of the page data. If the specified ECC code has been recorded in the repetitive data table 350, the mapping relationship about the information corresponding to the repetitive data in the repetitive data table 350 is updated. That is, the logical address of the page data is updated and recorded in the specified ECC code of the repetitive data table 350.

In the above embodiment, the repetitive data is judged in a page-wise fashion. That is, if the plural ECC codes of the page data are identical, it means that the write data from the host 12 contains the repetitive data. It is noted that numerous modifications and alterations may be made while retaining the teachings of the invention. For example, in another embodiment, the repetitive data is judged in a codeword-wise fashion. After the ECC circuit 112 performs the encoding operation on the plural codewords of the write data sequentially, plural ECC codes are generated sequentially. If at least two consecutive ECC codes of the plural ECC codes are identical, it means that the write data from the host 12 contains the repetitive data. Meanwhile, a repetitive data management mechanism is enabled by the control circuit 320. The flowchart of the repetitive data management mechanism is similar to that of FIG. 5, and is not redundantly described herein.

Figure 6A:
FIGS. 6A, 6B and 6C schematically illustrate a process of updating the contents of the repetitive data table according to an embodiment of the present invention.
Figure 6B:
Figure 6C:

FIGS. 6A, 6B and 6C schematically illustrate a process of updating the contents of the repetitive data table according to an embodiment of the present invention. In this embodiment, the information corresponding to the repetitive data is the ECC code. For example, it is assumed that plural codewords of one page data Page1 in the write data are all the first codeword (Codeword1). After the ECC circuit 112 performs the encoding operation on the plural first codewords (Codeword1), plural identical first ECC codes (ECC1) are generated. Under this circumstance, the control circuit 320 judges that the page data Page1 is the repetitive data and confirms that the write data contains the repetitive data. Then, the control circuit 320 judges whether the information (i.e., the first ECC code ECC1) corresponding to the repetitive data has been recorded in the repetitive data table 350.

Please refer to FIG. 6A. If the first ECC code ECC1 has not been recorded in the repetitive data table 350, the first ECC code ECC1 is newly added to the repetitive data table 350 by the control circuit 320. At the same time, the physical address PA_0 of the non-volatile memory 130 storing the repetitive data and the logical address LA_Page1 corresponding to the page data Page1 are recorded in the repetitive data table 350. In this embodiment, the logical address LA_Page corresponding to each page data contains plural logical addresses. For example, each codeword in the page data corresponds to one logical address.

As mentioned above, the encoded page data Page1 is the repetitive data, and the encoded page data Page1 comprises plural first codewords (Codeword1) and plural identical first ECC codes (ECC1). The repetitive data is stored in the physical address PA_0 of the non-volatile memory 130.

For example, it is assumed that plural codewords of another page data Page2 in the write data are all the second codeword (Codeword2). After the ECC circuit 112 performs the encoding operation on the plural second codewords (Codeword2), plural identical second ECC codes (ECC2) are generated. Under this circumstance, the control circuit 320 judges that the page data Page2 is the repetitive data and confirms that the write data contains the repetitive data. Then, the control circuit 320 judges whether the information (i.e., the second ECC code ECC2) corresponding to the repetitive data has been recorded in the repetitive data table 350.

Please refer to FIG. 6B. If the second ECC code ECC2 has not been recorded in the repetitive data table 350, the second ECC code ECC2 is newly added to the repetitive data table 350 by the control circuit 320. At the same time, the physical address PA_1 of the non-volatile memory 130 storing the repetitive data and the logical address LA_Page2 corresponding to the page data Page2 are recorded in the repetitive data table 350.

As mentioned above, the encoded page data Page2 is the repetitive data, and the encoded page data Page2 comprises plural second codewords (Codeword2) and plural identical second ECC codes (ECC2). The repetitive data is stored in the physical address PA_1 of the non-volatile memory 130.

For example, it is assumed that plural codewords of another page data Page3 in the write data are all the first codeword (Codeword1). After the ECC circuit 112 performs the encoding operation on the plural first codeword (Codeword1), plural identical first ECC codes (ECC1) are generated. Under this circumstance, the control circuit 320 judges that the page data Page3 is the repetitive data and confirms that the write data contains the repetitive data. Then, the control circuit 320 judges whether the information (i.e., the first ECC code ECC1) corresponding to the repetitive data has been recorded in the repetitive data table 350.

Please refer to FIG. 6C. Since the record about the first ECC code ECC1 has been stored in the repetitive data table 350, the record about the first ECC code ECC1 is updated and the logical address LA_Page3 corresponding to the page data Page3 are stored in the repetitive data table 350 corresponding to the first ECC code ECC1.

As mentioned above, the encoded page data Page3 is the repetitive data, and the encoded page data Page3 comprises plural first codewords (Codeword1) and plural identical first ECC codes (ECC1). The repetitive data is stored in the physical address PA_0 of the non-volatile memory 130. After the contents of the repetitive data table 350 are updated by the control circuit 320, the flowchart is ended. That is, the encoded page data Page3 with the plural first codewords (Codeword1) and the plural identical first ECC codes (ECC1) is not stored in the non-volatile memory 130 again.

When the host 12 issues a read command to read the read data from the logical address LA_Page1, the control circuit 320 confirms that the read data is stored in the physical address PA_0 of the non-volatile memory 130 according to the repetitive data table 350. Consequently, the encoded read data including the first codeword (Codeword1) is transmitted from the physical address PA_0 of the non-volatile memory 130 to the control circuit 320. After the ECC circuit 112 performs the decoding operation on the encoded read data, the read data is generated. Then, the read data is transmitted from the control circuit 320 to the host 12.

Similarly, when the host 12 issues a read command to read the read data from the logical address LA_Page3, the control circuit 320 confirms that the read data is stored in the physical address PA_0 of the non-volatile memory 130 according to the repetitive data table 350. Consequently, the encoded read data including the first codeword (Codeword1) is transmitted from the physical address PA_0 of the non-volatile memory 130 to the control circuit 320. After the ECC circuit 112 performs the decoding operation on the encoded read data, the read data is generated. Then, the read data is transmitted from the control circuit 320 to the host 12.

The technologies of the present invention may be further modified. For example, the information recorded in the ECC field of the repetitive data table 350 is not the complete ECC code.

For example, a first portion and a second portion of the first ECC code are retrieved. After a checksum algorithm is performed on the second portion of the first ECC code, a checksum value is generated. Then, the first portion of the first ECC code and the checksum value are combined as a representative value for representing the first ECC code being recorded in the ECC field of the repetitive data table 350. In such way, the data length of the ECC code is shortened.

For example, a codeword has a length of 4k bytes. After the codeword is encoded, the generated ECC code has a length of 488 bytes. The first ECC code (e.g., 488 bytes) is divided into a first portion (e.g., 16 bytes) and a second portion (e.g., 472 bytes). After the checksum algorithm is performed on the second portion of the first ECC code (e.g., 472 bytes), a checksum value having a length of 4 bytes is generated. Then, the first portion of the first ECC code (e.g., 16 bytes) and the checksum value (e.g., 4 bytes) are combined as a representative value having a size of 20 bytes. The representative value is used for representing the first ECC code being recorded in the ECC field of the repetitive data table 350. In such way, the data length of the ECC code is effectively shortened.

From the above descriptions, the present invention provides a solid state drive with a repetitive data management mechanism and a data processing method for the solid state drive. When the control circuit 320 confirms that the write data contains the repetitive data, the control circuit 320 stores one of the same repetitive data into the non-volatile memory 130 but does not store the other same repetitive data into the non-volatile memory 130. In addition, the associated mapping relationship is recorded into the repetitive data table 350. Consequently, the storage space of the non-volatile memory 130 is saved. Moreover, since the number of times the non-volatile memory 130 is programmed is reduced, the use life of the solid state drive 30 is prolonged effectively. Since only one of the plural same repetitive data is stored in the non-volatile memory 130, the program time of the non-volatile memory 130 is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A repetitive data processing method for a solid state drive, the solid state drive comprising a non-volatile memory, the repetitive data processing method comprising steps of:
   receiving a write data, wherein the write data contains plural codewords;
   performing an encoding operation on the plural codewords sequentially, thereby generating plural error correction codes sequentially;
   judging whether at least two consecutive error correction codes of the plural error correction codes are identical to a first error correction code; and
   if at least two consecutive error correction codes of the plural error correction codes are identical to the first error correction code, confirming that the write data contains a repetitive data and enabling a repetitive data management mechanism.

2. The repetitive data processing method as claimed in claim 1, wherein after the solid state drive confirms that the write data contains the repetitive data, a flag register is set and the repetitive data management mechanism is enabled.

3. The repetitive data processing method as claimed in claim 1, further comprising steps of:
   judging whether an information corresponding to the repetitive data is recorded in a repetitive data table after the solid state drive confirms that the write data contains the repetitive data; and
   if the information corresponding to the repetitive data is not recorded in the repetitive data table, storing the repetitive data into the non-volatile memory and newly adding the information corresponding to the repetitive data and a mapping relationship about the information into the repetitive data table.

4. The repetitive data processing method as claimed in claim 3, wherein if the information corresponding to the repetitive data has been recorded in the repetitive data table, the mapping relationship about the information in the repetitive data table is updated and the repetitive data is not stored in the non-volatile memory.

5. The repetitive data processing method as claimed in claim 3, wherein the information is the first error correction code or a representative value corresponding to the first error correction code.

6. The repetitive data processing method as claimed in claim 3, wherein the mapping relationship is a relationship about a physical address of the non-volatile memory storing the repetitive data and at least one logical address corresponding to the repetitive data.

7. A repetitive data processing method for a solid state drive, the solid state drive comprising a non-volatile memory, the repetitive data processing method comprising steps of:
   receiving a write data, wherein the write data contains a first page data, and the first page data contains plural codewords;
   performing an encoding operation on the plural codewords of the first page data, thereby generating plural error correction codes;
   judging whether the plural error correction codes are identical; and
   if the plural error correction codes are identical, confirming that the write data contains a repetitive data and enabling a repetitive data management mechanism.

8. The repetitive data processing method as claimed in claim 7, further comprising steps of:
   judging whether an information corresponding to the repetitive data is recorded in a repetitive data table after the solid state drive confirms that the write data contains the repetitive data; and
   if the information corresponding to the repetitive data is not recorded in the repetitive data table, storing the first page data into the non-volatile memory and newly adding the information corresponding to the repetitive data and a mapping relationship about the information into the repetitive data table.

9. The repetitive data processing method as claimed in claim 8, wherein if the information corresponding to the repetitive data has been recorded in the repetitive data table, the mapping relationship about the information in the repetitive data table is updated and the first page data is not stored in the non-volatile memory.

* * * * *